Aug. 22, 1961  F. M. JOHNSON ET AL  2,996,884
COMBUSTION CHAMBER

Filed Feb. 9, 1960  2 Sheets-Sheet 1

Inventors
FRANCIS MURRAY JOHNSON
ARTHUR HENRY LEFEBVRE
By
Cushman, Darby & Cushman
Attorneys

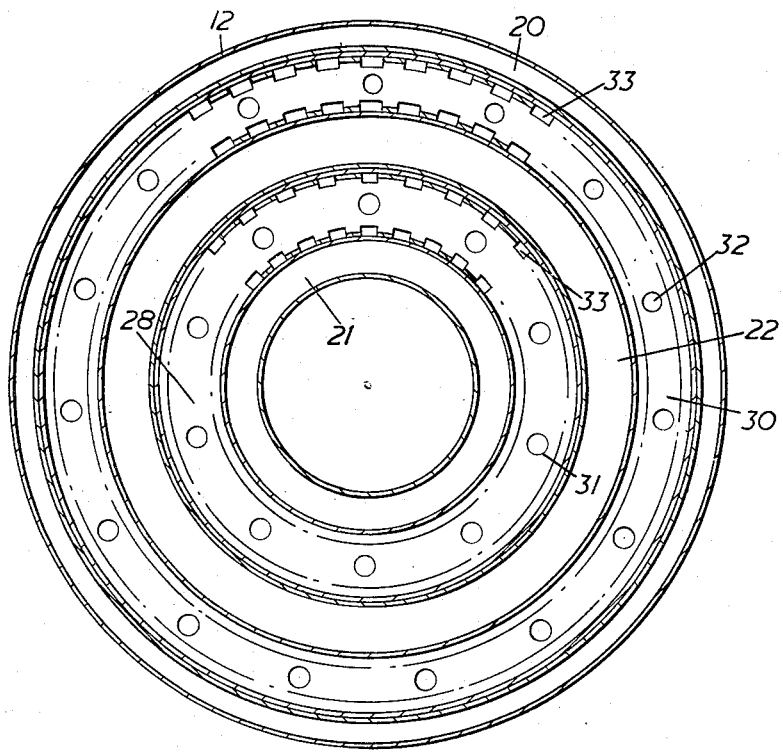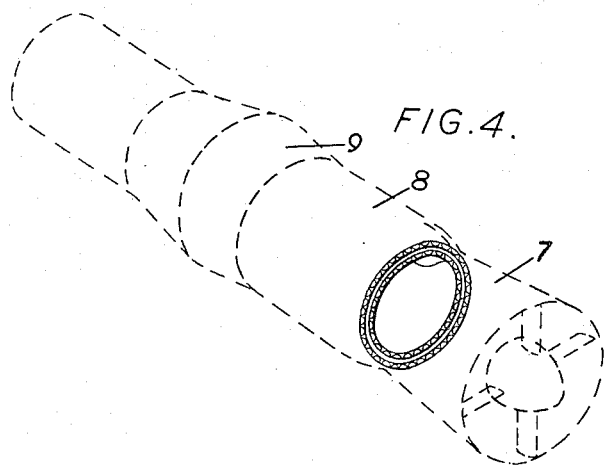

United States Patent Office 2,996,884
Patented Aug. 22, 1961

2,996,884
COMBUSTION CHAMBER
Francis Murray Johnson, Streatham, London, and Arthur Henry Lefebvre, Mackworth, Derby, England, assignors to Rolls-Royce Limited, Derby, England
Filed Feb. 9, 1960, Ser. No. 7,676
Claims priority, application Great Britain Mar. 11, 1959
8 Claims. (Cl. 60—39.65)

This invention concerns gas turbine engine combustion chambers.

According to the present invention there is provided a gas turbine engine combustion chamber having two combustion zones therein which are separated from each other by a central duct which extends from the upstream end of the chamber to a point downstream of said combustion zones, air inlet means at the upstream end of the chamber for supplying substantially all the air required for combustion, and means for supplying the central duct with substantially all the air employed for diluting the products of combustion, whereby the dilution air is supplied to the combustion chamber downstream of the said combustion zones.

Preferably the combustion chamber is an annular chamber having annular combustion zones therein. Thus two concentric rings of fuel injectors may be arranged within the annular chamber, one ring being provided for each combustion zone.

Each ring of fuel injectors may be mounted in an annular plate which blocks an annular combustion air duct leading to the respective combustion zone, slots being provided in each said plate adjacent said fuel injectors.

Means may be provided for supplying a film of cooling air to the internal wall of the combustion chamber. Thus the combustion chamber may comprise a flame tube made up of a plurality of sections the downstream end of each of which is mounted within the upstream end of the adjacent section with the interposition therebetween of a corrugated annular member, means being provided for supplying cooling air to a cooling air path arranged externally of the flame tube, whereby said cooling air enters the flame tube between the corrugations of the corrugated annular members.

The upstream end of the chamber may be provided with two corrugated members each of which divides the air flowing past it into two streams one of which is directed into the respective combustion air duct and the other of which is directed into the respective cooling air path, the streams flowing respectively within and between the corrugations of the corrugated member.

Figure 1:
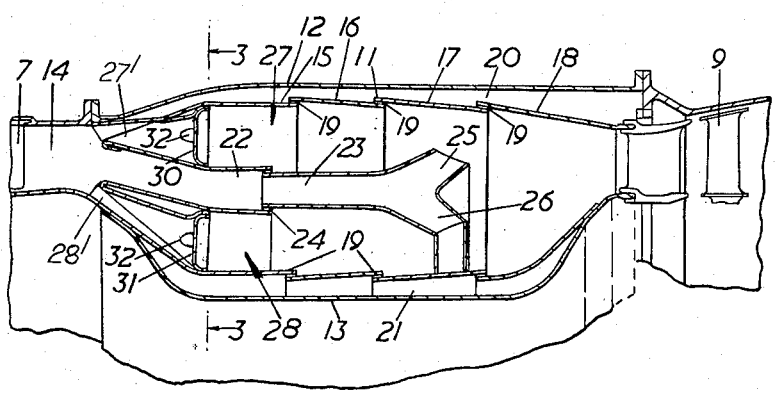
Figure 2:
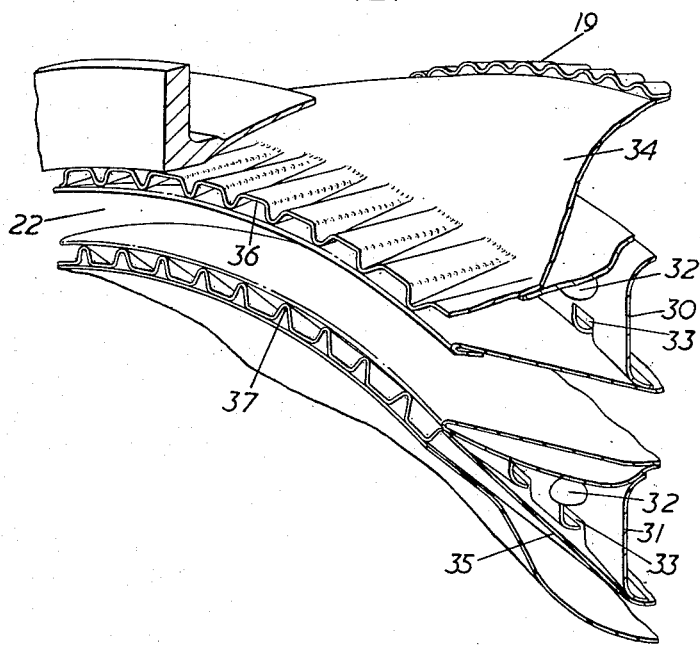

The invention is illustrated, merely by way of example, in the accompanying drawings in which:

FIGURE 1 is a longitudinal cross section through part of a combustion chamber according to the invention, FIGURE 2 is a broken away perspective view of part of the structure shown in FIGURE 1, FIGURE 3 is a section taken on the line 3—3 of FIGURE 1, and FIGURE 4 is a diagrammatic representation of a gas turbine engine incorporating the combustion chamber of FIGURES 1-3.

Referring first to FIGURE 4, a gas turbine engine comprises a compressor 7, combustion equipment 8, and turbine 9.

The combustion equipment 8 is shown in greater detail in FIGURES 1-3 and, as will be seen therein, comprises an annular flame tube 11 mounted between the engine casing 12 and an internal tubular wall 13, the flame tube 11 being arranged to be supplied with air from a passage 14 which communicates with the delivery end of the compressor 7.

The annular flame tube 11 is made up of a plurality of annular sections 15—18. The downstream end of each of the sections 15—17 is mounted within the upstream end of the respective sections 16—18 with the interposition therebetween of corrugated annular strip members 19. The flame tube 11 is spaced from the engine casing 12 and from the internal wall 13 by annular clearances 20, 21 respectively.

Mounted concentrically within the annular flame tube 11 is a two part annular air duct 22, 23, the part 23 being mounted within the part 22 with the interposition therebetween of corrugated annular strips 24. The upstream end of the part 22 communicates with the passage 14 so as to receive air therefrom, while the downstream end of the part 23 is forked into open-ended, downstream facing branches 25, 26 through which the said air is discharged into the sections 17, 18 of the flame tube. As will be clearly seen from FIGURE 1, the air duct 22, 23 constitutes a central duct which divides the annular flame tube 11 into two annular combustion zones, 27, 28, the central duct 22, 23 extending from the upstream end of the flame tube to a point downstream of the combustion zones 27, 28.

The combustion chamber is provided with two annular combustion air ducts 27', 28' leading respectively to the combustion zones 27, 28. The ducts 27', 28' are blocked at their downstream ends by annular plates 30, 31 respectively. Each of these plates carries a ring of spaced apart fuel injectors 32. The plates 30, 31 are toothed at their inner and outer circumferences so as to have a slot 33 immediately above and below each of the fuel injectors 32.

Annular plates 34, 35 having corrugated upstream ends 36, 37 respectively, are positioned to divide that quantity of the air from the passage 14 which does not pass into the central duct 22, 23. Almost all the air supplied to the corrugated upstream ends 36, 37 passes within the corrugations thereof so as to pass through the slots 33, while a minor proportion of this air passes between said corrugations so as to pass to the clearances 20, 21.

The arrangement is such that all the air required to support the combustion of the fuel injected from the fuel injectors 32 passes through the slots 33. Moreover, substantially all the remaining air supplied to the combustion chamber constitutes "dilution" air which is caused to pass through the central duct 22, 23 so as to emerge through the branches 25, 26 downstream of the combustion zones 27, 28. This "dilution" air serves to cool down the products of combustion to temperatures suitable for operation of the engine turbine 9. 4–8% of the air flows through the clearances 20, 21 and enters the internal walls of the flame tube 11 through the corrugations of the strip members 19 so as to effect film cooling of said walls.

Previously it has been the practice in combustion chambers of gas turbine engines to provide only a portion of the air required for combustion at, or upstream of, the fuel injectors. This portion has been known as the "primary air." A further proportion of the air required for combustion (known as "secondary air") has been introduced into the flame tube downstream of the combustion zone to reverse the direction of flow of the combustion products in the combustion zone and to provide the additional air required to complete the combustion.

In contrast, in the combustion chamber shown in the drawings no secondary air is used, all the air required to support and complete the combustion entering through the slots 33 so as to be supplied at the upstream end of the combustion zones 27, 28. By this means efficient combustion can be obtained at significantly lower values of pressure loss than are possible by the conventional method of air admission.

Moreover, in the combustion chamber shown in the drawings both the combustion air and also the "dilution"

air flowing through the central duct 22, 23 has a substantially straight through path, and thus avoids the necessity for the long diffuser (which is normally fitted) upstream of the flame tube.

In a conventional chamber the diffuser length can, of course, be reduced, but this results in a consequent increase in pressure loss whereas the proposed system provides a method of appreciably shortening the diffuser with no increase in pressure loss.

We claim:

1. In a gas turbine engine, the improvement comprising a combustion chamber structure having two combustion zones therein, a central duct which separates the combustion zones from each other and which extends from the upstream end of the chamber structure to a point downstream of said combustion zones, said central duct being open at each of its opposite ends, axially directed air inlet means at the upstream end only of the chamber structure for supplying substantially all the air required for combustion, and means for supplying the central duct with substantially all the air employed for diluting the products of combustion, whereby the dilution air is supplied to the combustion chamber structure downstream of the said combustion zones.

2. In a gas turbine engine, the improvement comprising an annular combustion chamber structure having two annular combustion zones therein, a central duct which separates the combustion zones from each other and which extends from the upstream end of the chamber structure to a point downstream of said combustion zones, said central duct being open at each of its opposite ends, axially directed air inlet means at the upstream end only of the chamber structure for supplying substantially all the air required for combustion, and means for supplying the central duct with substantially all the air employed for diluting the products of combustion, whereby the dilution air is supplied to the combustion chamber structure downstream of the said combustion zones.

3. In a gas turbine engine, the improvement comprising an annular combustion chamber structure having two annular combustion zones therein, two concentric rings of fuel injectors arranged within the annular chamber structure, one ring being provided for each combustion zone, a central duct which separates the combustion zones from each other and which extends from the upstream end of the chamber structure to a point downstream of said combustion zones, said central duct being open at each of its opposite ends, axially directed air inlet means at the upstream end only of the chamber structure for supplying substantially all the air required for combustion, and means for supplying the central duct with substantially all the air employed for diluting the products of combustion, whereby the dilution air is supplied to the combustion chamber structure downstream of the said combustion zones.

4. In a gas turbine engine, the improvement comprising an annular combustion chamber structure having two annular combustion zones therein, two annular combustion air ducts leading respectively to the two combustion zones, an annular slotted plate mounted in each combustion air duct, a ring of fuel injectors mounted in each plate, the slots in the plate being provided adjacent the fuel injectors, a central duct which separates the combustion zones from each other and which extends from the upstream end of the chamber structure to a point downstream of said combustion zones, the downstream end of the central duct being open and facing downstream, axially directed air inlet means at the upstream end of the chamber structure for supplying substantially all the air required for combustion, and means for supplying the central duct with substantially all the air employed for diluting the products of combustion, whereby the dilution air is supplied to the combustion chamber structure downstream of the said combustion zones.

5. A combustion chamber structure as claimed in claim 4 in which slots are provided in said plates on opposite sides of each of the fuel injectors.

6. In a gas turbine engine, the improvement comprising a combustion chamber structure having two combustion zones therein, a central duct which separates the combustion zones from each other and which extends from the upstream end of the chamber structure to a point downstream of said combustion zones, the downstream end of the central duct being open and facing downstream, axially directed air inlet means at the upstream end only of the chamber structure for supplying substantially all the air required for combustion, means for supplying a film of cooling air to the internal wall of the combustion chamber structure, and means for supplying the central duct with substantially all the air employed for diluting the products of combustion, whereby the dilution air is supplied to the combustion chamber structure downstream of the said combustion zones.

7. A combustion chamber structure as claimed in claim 6 in which the combustion chamber structure comprises a flame tube made up of a plurality of sections the downstream end of each of which is mounted within the upstream end of the adjacent section with the interposition therebetween of a corrugated annular member, means being provided for supplying cooling air to a cooling air path arranged externally of the flame tube, whereby said cooling air enters the flame tube between the corrugations of the corrugated annular members.

8. A combustion chamber structure as claimed in claim 7 in which the upstream end of the chamber structure is provided with two corrugated members each of which divides the air flowing past it into two streams one of which is directed into the respective combustion air duct and the other of which is directed into the respective cooling air path, the streams flowing respectively within and between the corrugations of the corrugated member.

References Cited in the file of this patent

UNITED STATES PATENTS

| 2,448,561 | Way | Sept. 7, 1948 |
| 2,545,495 | Sforzini | Mar. 20, 1951 |

FOREIGN PATENTS

| 620,270 | Great Britain | Mar. 22, 1949 |
| 741,488 | Great Britain | Dec. 7, 1955 |